Figures 1, 2:
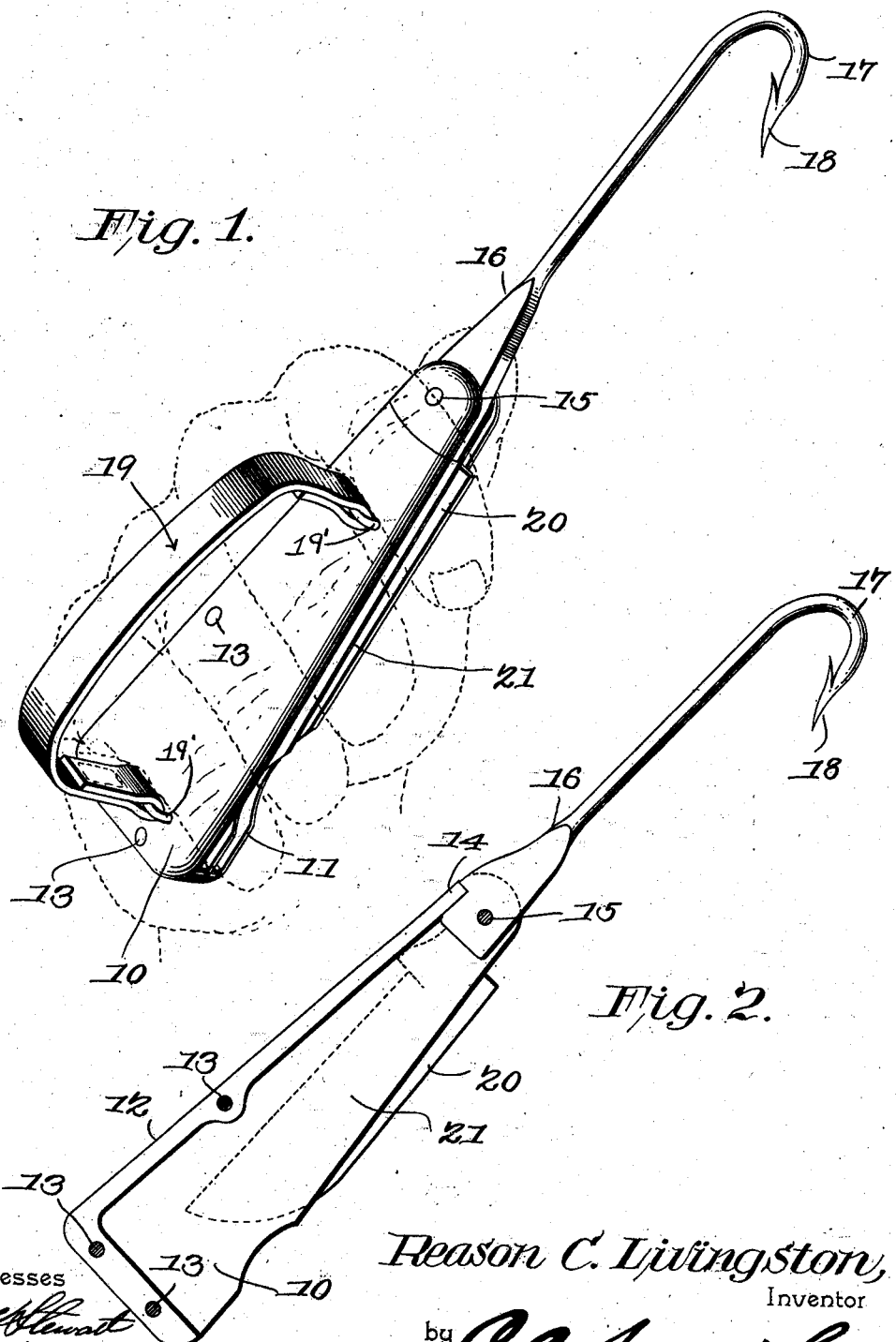

No. 827,246.

PATENTED JULY 31, 1906.

R. C. LIVINGSTON.
GAFF HOOK.
APPLICATION FILED FEB. 11, 1905.

Witnesses

Reason C. Livingston,
Inventor by C. A. Snow & Co.
Attorneys

THE NORRIS PETERS CO., WASHINGTON, D. C.

UNITED STATES PATENT OFFICE.

REASON C. LIVINGSTON, OF SPRING VALLEY, MINNESOTA.

GAFF-HOOK.

No. 827,246.     Specification of Letters Patent.     Patented July 31, 1906.

Application filed February 11, 1905. Serial No. 245,270.

*To all whom it may concern:*

Be it known that I, REASON C. LIVINGSTON, a citizen of the United States, residing at Spring Valley, in the county of Fillmore and State of Minnesota, have invented a new and useful Gaff-Hook, of which the following is a specification.

This invention relates to implements employed by fishermen for assisting in caring for the fish which they capture, and has for its object to combine in one handle the various tools thus employed in position to be independently projected from the handle when required and foldable therein when not required.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of the improved implement. Fig. 2 is a side view with one side member of the handle portion detached.

The improved device comprises a handle portion formed of spaced sides 10 11 and one or more intermediate plates 21 and with a spacer member 12 between the sides and the intermediate plate, the spacer members secured at one end only, as by transverse rivets 13, leaving the other end unsupported between the side members and intermediate member, as at 14.

Pivoted at 15 between the side members 10 11 and opposite the unsupported end of one of the resilient spacer-bars 12 is an arm 16, having a backwardly-turned hook 17 at the free end, the hook having a barbed terminal 18, and likewise supported by the same pivot member 15 opposite the unsupported end of another of the spacer members 12 is a cutting-blade 20.

The bar 16, with its barbed hooks 17 18 and the blade 20, are independently foldable into the handle or extensible therefrom, as required, the resiliency of the free and unsupported ends of the members 12 locking them both in closed and open position.

To the side plate 10 a flexible strap 19 for inclosing the fingers of the hand which grasps the implement is attached by means of rigid loops 19', which may be staples with their extremities inserted and riveted through the plate 10.

It will thus be noted that a convenient and useful implement is produced which may be employed by fishermen in "landing" the fish by using the hooked member 16 and then caring for the captured fish with the cutting-blade 20, and when not in use the members 16 and 20 may be folded into the handle member and carried in the pocket or other receptacle.

The implement may be of any required size or of any fanciful design or of any required material.

Having thus described the invention, what is claimed is—

The gaff comprising a wedge-shaped handle having two of its surfaces substantially straight and uninterrupted and tapered gradually from one end to the other, the large and small ends of the handle adapted to be gripped by the index and little fingers respectively, of a hand, a barbed hook pivoted within the small end of the handle and having a tapered arm or shank the faces of which substantially aline with the faces of the handle, loops upon one of the tapered surfaces of the handle, and a retaining-strap secured at its ends to the loops.

In testimony that I claim the foregoing as my own I have hereto affixed my signature in the presence of two witnesses.

REASON C. LIVINGSTON.

Witnesses:
R. J. PARKER,
NELLIE TAIT.